(12) United States Patent
Svaasand et al.

(10) Patent No.: US 12,552,994 B2
(45) Date of Patent: Feb. 17, 2026

(54) INJECTOR, REACTOR, APPARATUS AND PROCESS FOR PYROLYSIS OF POLYMERIC MATERIAL

(71) Applicant: EAGLE TECHNOLOGY AS, Stavanger (NO)

(72) Inventors: Jan Christer Svaasand, Stavanger (NO); Ørjan Samuelsen, Stavanger (NO)

(73) Assignee: EAGLE TECHNOLOGY AS, Stavanger (NO)

( * ) Notice: Subject to any disclaimer, the term of this patent is extended or adjusted under 35 U.S.C. 154(b) by 280 days.

(21) Appl. No.: 18/073,774

(22) Filed: Dec. 2, 2022

(65) Prior Publication Data

US 2024/0182792 A1 Jun. 6, 2024

(51) Int. Cl.
*C10B 53/07* (2006.01)
*C10B 7/10* (2006.01)
(Continued)

(52) U.S. Cl.
CPC .............. *C10G 1/10* (2013.01); *C10B 7/10* (2013.01); *C10B 31/10* (2013.01); *C10B 31/12* (2013.01);
(Continued)

(58) Field of Classification Search
CPC ...................................... C10B 53/07
See application file for complete search history.

(56) References Cited

U.S. PATENT DOCUMENTS 3,720,241 A    3/1973 Bryant et al.
3,947,256 A *  3/1976 Tsukagoshi ............... C10B 7/10
                                                208/15
(Continued)

FOREIGN PATENT DOCUMENTS

CN    204660686 U    9/2015
CN    210312178 U    4/2020
(Continued)

OTHER PUBLICATIONS

PE2E translation of WO-2006092306-A1.*
(Continued)

*Primary Examiner* — Jonathan Luke Pilcher
(74) *Attorney, Agent, or Firm* — Alix, Yale & Ristas, LLP (57) ABSTRACT

A pyrolysis injector includes a feeder unit with a first inlet for particulate polymeric material and a second inlet for oil, wherein said first inlet and said second inlet lead to a reservoir arranged for mixing said particulate polymeric material and oil into oil-wet particulate polymeric material, and with one or more feeding auger arranged in a feeder gutter portion of said reservoir, the feeder gutter portion leading to a narrowing pipe portion about an end portion of the one or more feeder auger arranged for compacting the oil-wet particulate polymeric material for form a compacted oil-wet particulate polymeric material, the narrowing pipe portion leading to a compacting pipe which is arranged for feeding the compacted oil-wet particulate polymeric material to a third inlet of a pyrolysis reactor, the pyrolysis reactor provided with at least one first outlet for pyrolysis fluids in gaseous form, one or more first heating elements arranged for heating the reservoir with the oil-wet particulate polymeric material (and oil) present therein, and for boiling off water and/or chemicals, one or more second heating elements arranged on the compacting pipe with the (Continued)

compacted oil-wet particulate polymeric material and arranged for pre-heating the compacted oil-wet particulate polymeric material before injection to the third inlet of the pyrolysis reactor, and wherein the second inlet for oil is arranged for receiving a part of an intermediary pyrolysis fluid of the pyrolysis fluids in a condensed liquid state back to the reservoir.

14 Claims, 9 Drawing Sheets

(51) Int. Cl.
 *C10B 31/10* (2006.01)
 *C10B 31/12* (2006.01)
 *C10G 1/10* (2006.01)
(52) U.S. Cl.
 CPC ...... *C10B 53/07* (2013.01); *C10G 2300/1003* (2013.01); *C10G 2300/4081* (2013.01)

(56) References Cited

U.S. PATENT DOCUMENTS

| | | | | |
|---|---|---|---|---|
| 4,123,332 A * | 10/1978 | Rotter | ............... | C10B 7/10 |
| | | | | 202/137 |
| 4,308,103 A * | 12/1981 | Rotter | ............... | C10B 53/00 |
| | | | | 202/265 |
| 4,983,278 A | 1/1991 | Cha et al. | | |
| 5,608,136 A * | 3/1997 | Maezawa | ............... | C10G 1/10 |
| | | | | 588/317 |
| 7,691,344 B2 * | 4/2010 | Yoshimura | ............... | F23G 7/12 |
| | | | | 422/198 |
| 8,938,189 B2 | 1/2015 | Murata et al. | | |
| 10,421,911 B2 * | 9/2019 | Ullom | ............... | C10B 47/30 |
| 2009/0050525 A1 * | 2/2009 | Sappok | ............... | C10G 1/10 |
| | | | | 208/106 |
| 2016/0024390 A1 * | 1/2016 | Ullom | ............... | C10G 1/086 |
| | | | | 202/99 |
| 2022/0080480 A1 | 3/2022 | Gray et al. | | |

FOREIGN PATENT DOCUMENTS

| | | | | |
|---|---|---|---|---|
| CN | 211420054 U | 9/2020 | | |
| EP | 3 690 007 A1 | 8/2020 | | |
| GB | 2 301 112 A | 11/1996 | | |
| JP | 55141555 A | 11/1980 | | |
| JP | 2005-104095 A | 4/2005 | | |
| JP | 2005239337 A | 9/2005 | | |
| JP | 2006176296 A | 7/2006 | | |
| WO | WO 99/50374 A1 | 10/1999 | | |
| WO | WO-2006092306 A1 * | 9/2006 | ............... | C10G 1/10 |
| WO | WO 2015/082755 A2 | 6/2015 | | |
| WO | WO 2020/051702 A1 | 3/2020 | | |
| WO | WO 2020/051703 A1 | 3/2020 | | |
| WO | 2021216281 A1 | 10/2021 | | |

OTHER PUBLICATIONS

Norwegian Search Report for Norwegian Application No. 20221297, dated Mar. 29, 2023, with an English translation.
International Search Report for International Application No. PCT/NO2023/060108, dated Mar. 6, 2024.
Written Opinion of the International Searching Authority for International Application No. PCT/NO2023/060108, dated Mar. 6, 2024.

* cited by examiner

Fig. 1 – Pyrolysis injector (1)

Fig. 2 – Pyrolysis reactor (3)

Fig. 3 – Pyrolysis reactor (3)

INJECTOR, REACTOR, APPARATUS AND PROCESS FOR PYROLYSIS OF POLYMERIC MATERIAL

FIELD OF THE INVENTION

The present invention relates to pyrolysis of polymeric material. More specifically, the invention relates to a pyrolysis injector, pyrolysis reactor and pyrolysis apparatus for pyrolysis of polymeric material and a process for pyrolysis of polymeric material such as, for example, waste polymeric material such as plastic and rubber waste.

BACKGROUND OF THE INVENTION

The world is generally polluted by enormous amounts of waste plastic especially in the rivers, lakes and in the sea. The waste may take thousands of years to disintegrate naturally.

Microparticles of plastic form during the disintegration process. Such microplastic particles are generally not desirable. Part of such microparticles formed inadvertently enter into the biological chain. It is therefore highly desirable to recycle waste plastic and rubber waste or convert such waste to petroleum products such as oil and gas.

There is an increasing demand for recycling plastic waste instead of burning or disposing it in waste dumps. There is a need for recycling plastic waste into re-usable products. However, in 2019, less than 29% of municipal plastic waste, about 100 000 tons in Norway, mainly mechanically recuperated, was used for material recycling. Laminated plastic on other substrates, and polluting particles in the plastic waste, often makes mechanical recuperation difficult or impossible, and for a large proportion of the plastic waste burning or deposition in dumps are presently the most practical alternatives to recycling.

The present invention which provides an improved pyrolysis plant and process, is directed toward those problems of otherwise mechanically non-separable thus non-recuperable plastic wastes which constitute a large proportion of the present problem of plastic waste.

As a further illustration of the problem, there is an annual pollution of the seas of about 10 million tons of plastic waste, which in practice is a permanent pollution, and solar radiation and mechanical degradation into microplastic particles only make the problem worse, and mechanical recuperation often impossible.

Pyrolysis is a chemical reaction wherein natural or synthetic organic solids are decomposed by heating without allowing oxygen to influence the process. Pyrolysis may take place in a vacuum, as is the case in vacuum pyrolysis, or an inert atmosphere, e.g. nitrogen, to replace atmospheric oxygen. In the pyrolysis apparatus, waste that contains hydrocarbons, for example plastic and/or rubber waste, is processed such that the process mainly produces hydrocarbons such as oil and gas of shorter carbon chain lengths.

WO 2015/082755 A2 discloses a pyrolysis apparatus for processing shredded waste material such as plastic and/or rubber waste, the pyrolysis apparatus including a feed device, a pyrolysis reactor, an outlet portion, and a gas collector for collecting the gas from the pyrolysis reactor.

JP 2005104095 A1 discloses a waste plastic pyrolysis reactor comprising a cylindrical furnace body having heating elements and an oil bath for heating waste plastic. Further, the reactor comprises a condenser to condense heavy oil fragments. The furnace has a specific gravity sensor which controls the opening and closing of the oil outlet in the oil tub, and a gas temperature sensor that detects the temperature of oil vapor is inserted into the furnace body.

Although a wide range of pyrolysis apparatuses and processes are known in the art, there is still a need for improved injectors, reactors, apparatuses and processes that can be used for pyrolysis of particulate polymeric material in a more efficient, independent and continuous operation from waste material to products, such as oil and gas.

SUMMARY OF THE INVENTION

It is an object of the present invention to provide an improved pyrolysis injector, reactor and/or apparatus which overcome some or all of problems of the background art and make it possible to produce petroleum products in a more efficient matter. Another object of the present invention is to provide a vessel, such as a ship, a barge or an offshore platform, equipped with a pyrolysis injector, reactor and/or apparatus. Yet another object of the present invention is to provide an improved process for pyrolysis of particulate polymeric material.

Accordingly, in one aspect, the present invention provides a pyrolysis injector (1) comprising:

a feeder unit (10) with a first inlet (12) for particulate polymeric material and a second inlet (14) for oil, wherein said first inlet (12) and said second inlet (14) lead to a reservoir (13) arranged for mixing said particulate polymeric material and oil into oil-wet particulate polymeric material, and with one or more feeding auger (22) arranged in a feeder gutter portion (23) of said reservoir (13), said feeder gutter portion (23) leading to a narrowing pipe portion (24) about an end portion of said one or more feeder auger (22) arranged for compacting said oil-wet particulate polymeric material for forming a compacted oil-wet particulate polymeric material, said narrowing pipe portion (24) leading to a compacting pipe (26) which is arranged for feeding said compacted oil-wet particulate polymeric material to a third inlet (30) of a pyrolysis reactor (3), said pyrolysis reactor (3) provided with at least one first outlet (31) for pyrolysis fluids (41a, 41b, 41c) in gaseous form, one or more first heating elements (15) arranged for heating said reservoir (13) with said oil-wet particulate polymeric material (and oil) present therein, and for boiling off water and/or chemicals, one or more second heating elements (28) arranged on said compacting pipe (26) with said compacted oil-wet particulate polymeric material and arranged for pre-heating said compacted oil-wet particulate polymeric material before injection to said third inlet (30) of said pyrolysis reactor (3), and wherein said second inlet (14) for oil is arranged for receiving a part of an intermediary pyrolysis fluid (41b) of said pyrolysis fluids (41a, 41b, 41c) in a condensed liquid state back to said reservoir (13).

In another aspect, the present invention provides a pyrolysis reactor (3) comprising:

a pyrolysis injector, preferably the pyrolysis injector (1) according to the invention, a pyrolysis chamber pipe (33) enveloping a paddle conveyor auger (32), arranged for conveying and pyrolyzing feed of said compacted oil-wet particulate polymeric materials, from said third inlet (30) connected from said pyrolysis injector (1), into said pyrolysis fluids (41a, 41b, 41c)

at least one first outlet (31) for said pyrolysis fluids (41a, 41b, 41c) (of increasing carbon chain lengths) which is further connected to a first condenser (50) for condensing a first pyrolysis fluid (41c) of said pyrolysis fluids (41a, 41b, 41c), and a fourth inlet (39) for receiving at least part of said first pyrolysis fluid (41c), (arranged near said third inlet (30)) to said pyrolysis reactor (3), for receiving all or part of said first pyrolysis fluid (41c) in a condensed state from a second outlet (53) for said condensed first pyrolysis fluid (41c) on said first condenser (50).

In another aspect, the present invention relates to a pyrolysis apparatus comprising a pyrolysis injector according to the invention.

In another aspect, the present invention relates to a pyrolysis apparatus comprising a pyrolysis reactor according to the invention.

In another aspect, the present invention relates to a vessel, such as a barge, a ship or a mobile offshore platform, comprising a pyrolysis injector according to the invention, a pyrolysis reactor according to the invention and/or a pyrolysis apparatus according to the invention.

In another aspect, the present invention provides a process for pyrolysis of particulate polymeric material which comprises:
providing an oil-wet particulate polymeric material in a pyrolysis injector comprising one or more heating elements;
pre-heating the oil-wet particulate polymeric material;
injecting the pre-heated oil-wet particulate polymeric material to a pyrolysis reactor comprising one or more heating devices,
heating the pre-heated oil-wet particulate polymeric material to form one or more gaseous pyrolysis products;
withdrawing one or more gaseous pyrolysis products from the pyrolysis reactor and condensing the one or more gaseous pyrolysis products to form one or more pyrolysis fluids;
feeding at least part of the one or more condensed pyrolysis fluids to the pyrolysis injector;
feeding at least part of the one or more condensed pyrolysis fluids to the pyrolysis reactor.

The pyrolysis injector, pyrolysis reactor, pyrolysis apparatus and process according to the invention make it possible to attain numerous advantages, including for example the following:
Continuous operation of pyrolysis injection and pyrolysis reaction;
Energy consumption can be decreased compared to energy consumption in the prior art;
Ability to subject many types of polymeric materials to pyrolysis, e.g. waste plastic and/or rubber materials, including combination of rubber and plastic;
The pyrolysis injector, reactor, apparatus and process can be arranged and operated on a vessel with increased mobility, thereby enabling pyrolysis of waste polymeric material present in and/or collected from seas, lakes, rivers and shores thereof;
All or part of the energy required for running the pyrolysis process may be obtained from part of the pyrolysis fluids produced in the pyrolysis process itself;
Reinjection of pyrolysis fluids back to the pyrolysis injector and/or pyrolysis reactor increases the production of pyrolysis fluids and their quality;
Using the non condensable pyrolysis fluids for providing energy to the process itself will reduce the release of such gaseous products to the atmosphere.

Hereby the present invention provides significant technical, environmental and economic benefits.

These and other objects and aspects of the invention and embodiments of the invention will be described in further detail hereinafter.

BRIEF DESCRIPTION OF THE DRAWINGS

The invention is described hereinafter, by way of example only, with reference to the accompanying drawings in which.

TABLES OF REFERENCE NUMERALS

The following reference numbers refer to the drawings:

| Reference Numerals | Component/Description |
|---|---|
| 1 | Pyrolysis injector |
| 3 | Pyrolysis reactor |
| 10 | Feeder unit |
| 12 | First inlet, for particulate polymeric material |
| 13 | Reservoir, for mixing particulate polymeric material and oil |
| 14 | Second inlet, for oil |
| 15 (a, b, c, . . .) | One or more first heater element |
| 16 (a, b, c, . . .) | One or more level sensor |
| 19 (a, b, c, . . .) | One or more temperature sensor |
| 20 | |
| 21 | Drive motor for feeder auger |
| 22 | One or more feeder auger |
| 23 | Feeder gutter portion |
| 24 | Narrowing pipe portion |
| 26 | Compacting pipe |
| 28 (a, b, c, . . .) | One or more second heater elements |
| 29 | First tilt system, for pyrolysis injector |
| 30 | Third inlet, for connection to a pyrolysis injector |
| 31 (a, b, c, . . .) | At least one first outlet, for pyrolysis fluids (41a, 41b, 41c) |
| 32 | Paddle conveyor auger |
| 33 | Pyrolysis chamber pipe |
| 34 (a, b, c, . . .) | Successive heating devices |
| 35 (a, b, c, . . .) | One or more heating devices |
| 36 | Fourth outlet for solids (e.g. ash) |
| 37 | Fourth inlet, for first pyrolysis fluid (41c) |
| 38 | Screw conveyor |

| Reference Numerals | Component/Description |
|---|---|
| 39 | Catalyser |
| 40 | Drive motor (27) for paddle conveyor auger |
| 41 (a, b, c) | Pyrolysis fluids (41a, 41b, 41c) |
| 41a | Third pyrolysis fluid |
| 41b | Intermediary pyrolysis fluid |
| 41c | First pyrolysis fluid |
| 42 | Fifth inlet, for intermediary pyrolysis fluid |
| 43 | Second tilt system, for pyrolysis reactor (3) |
| 44 | Reactor funnel |
| 45 | Waste box |
| 46 | Waste skip |
| 50 | First Condenser |
| 53 | Second outlet, for first condensed pyrolysis fluid (41c) |
| 60 | Second Condenser |
| 63 | Third outlet, for intermediary condensed pyrolysis fluid (41b) |
| 70 | Heat exchanger, for condensing a third pyrolysis fluid (41a) |
| 71 | Collection tank, for third pyrolysis fluid (41a) |
| 73 | Fifth outlet, for third condensed pyrolysis fluid (41a) |
| 74 | Gas cleaning tank |
| 80 | Inert gas bank e.g. Nitrogen |
| ... | |
| 90 | Air fan for cooling |
| 91 | Water cooler skid |
| 92 | Heat pump cooler skid |
| 100 | Feeder system |
| 110 | Polymeric material inlet line |
| 120 | Buffer day silo |
| 121 | Particulate polymeric material agitator |
| 122 | First motorized, screw conveyor auger |
| 200 | Line to compacting pipe (26) |
| 201 | Line from pyrolysis injector (1) |
| 202 | Line to first condenser (50) |
| 203 | Line from first condenser (50) |
| 204 | Line from second condenser (60) |
| 205 | Line from inert gas bank (80) |
| 206 | Line from first outlet (31) of pyrolysis reactor |
| 207 | Line to fourth inlet (37) of pyrolysis reacotr |
| 208 | Line to second condenser (60) |
| 209 | Line from inert gas bank |
| 210 | Line to cooling system (90) |
| 211 | Line from cooling system (90) |
| 212 | Line to cooling system (90) |
| 213 | Line from cooling system (90) |
| 214 | Line for first pyrolysis fluid (41c) in condensed state to a storage facility |
| 215 | Line from first condenser (50) |
| 216 | Line to fifth inlet (42) of pyrolysis reactor (3) |
| 217 | Line for to heat exchanger (70) |
| 218 | Line of non condensable part of third pyrolysis fluid (41) to e.g. an incinerator or gas turbine for energy production |
| 219 | Line for third pyrolysis fluid (41a) in condensed state to a storage facility |
| 220 | Line to cooling system (90) |
| 221 | Line from cooling system (90) |
| 222 | Line to cooling system (90) |
| 223 | Line from cooling system (90) |
| 224 | Line to a inert gas bank (80) |
| 225 | Line for intermediary pyrolysis fluid (41b) to a storage facility |
| 227 | Line from first condenser (50) to cooling system (90) |
| 228 | Line from second condenser (60) to cooling system (90) |

DESCRIPTION OF EMBODIMENTS OF THE INVENTION

The term "polymeric material", as used herein, refers to a polymeric material which may be selected from plastic and/or rubber material, preferably from waste plastic and/or rubber waste. Examples of suitable plastic materials include polyolefins, e.g. homo and copolymers of ethylene, propylene and various comonomers that are copolymerizable with ethylene and/or propylene, homo and copolymers of vinyl chloride, styrene, etc. Examples of suitable rubber materials includes polymer, like plastic. Such rubbers are synthetic, and most common rubber types are neoprene rubber, nitrile rubber, ethylene diene monomer rubber, styrene-butadiene rubber, butyl rubber and fluorosilicone rubber.

The term "particulate polymeric material", as used herein, refers to a particulate polymeric material which may have an average particle size in the range of from 1 to 50 mm, suitably in the range of from 3 to 40 mm, and preferably in the range of from 6 to 20 mm. The average particle size of the particulate polymeric material can be measured by means of measuring the largest length of a flakes or particles from a sample of shredded polymeric materials for entering the first inlet (12). Typically such flakes are of shredded plastic bags or ropes with flake thickness much less than 1 mm and largest diameter in the range from 6 to 20 mm, which is easily measured manually by a millimetre measuring tool or which may be automatically measured by a computer-controlled camera measurement system.

The term "oil", as used herein, refers to an oil which may be selected from hydrocarbons containing carbon atoms in each molecule, suitable from carbon chains from 2 to more than 20 carbon atoms and preferably from 13 to 20 carbon atoms. The oil used in the reservoir (13) for particulate polymeric material and oil should generally have a density lighter than the particulate polymeric material feed into the pyrolysis injector inlet (12), such that the particulate polymeric material sinks to the feeder gutter portion (23).

The term "oil-wet particulate polymeric material", as used herein, refers to a mixture of oil and particulate polymeric material as defined herein.

The present invention and various embodiments thereof are described below with reference to the drawings, which are to be considered in all aspects as illustrative only and not restrictive in any manner. Elements illustrated in the drawings are not necessarily to scale, emphasis instead being placed upon clearly illustrating the principles of the invention. This invention may be provided in other specific forms and embodiments without departing from the essential characteristics described herein.

Figure 1:
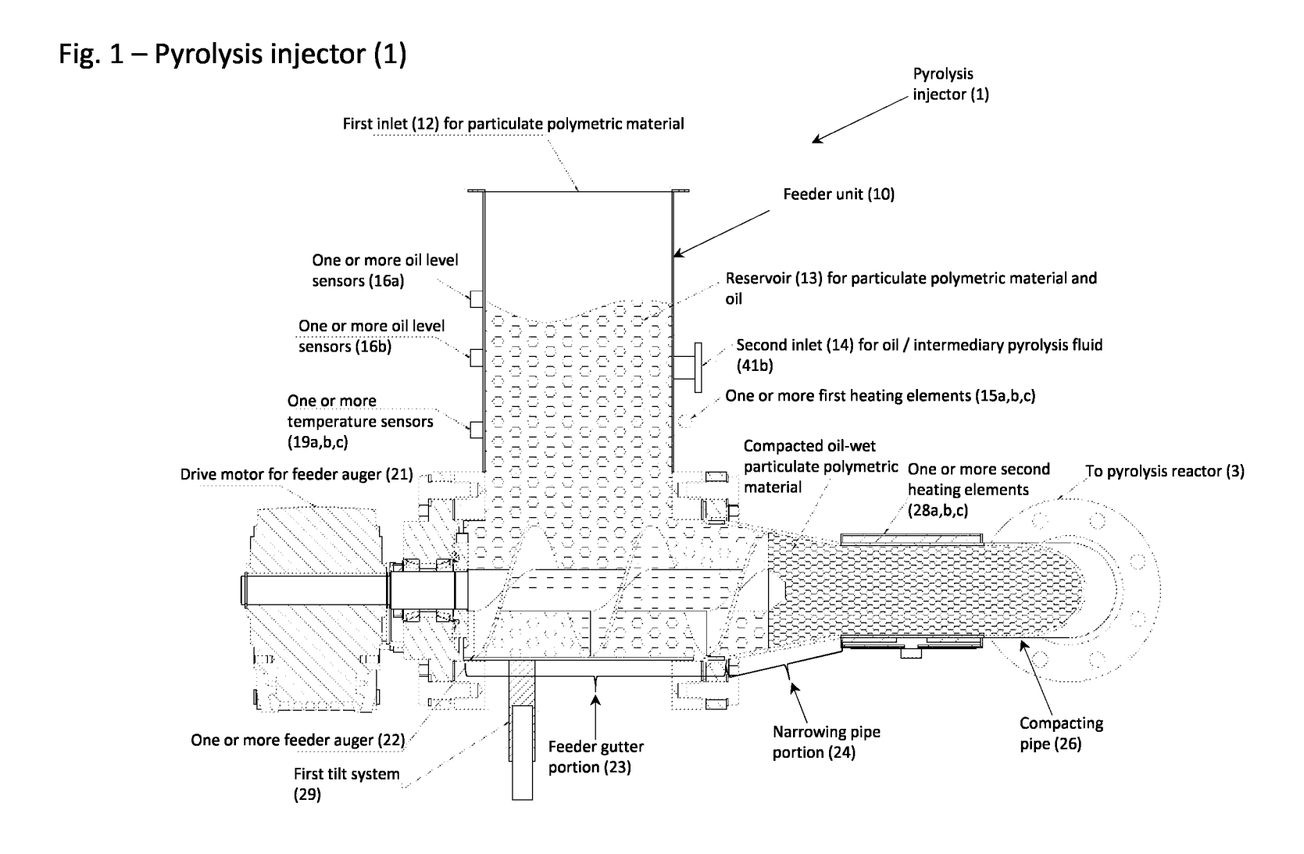
FIG. 1 is a longitudinal section and view of an embodiment of a pyrolysis injector for plastic or rubber waste material to a pyrolysis chamber.

FIG. 1 is a longitudinal section and view of an embodiment of the invention comprising a pyrolysis injector (1) for compacted oil-wet particulate polymeric material to a pyrolysis reactor, more specifically to a pyrolysis reactor chamber pipe (33). The Figure shows a first inlet (12) for polymeric materials at the top of a feeder unit (10), which is formed as an inlet duct and works as part of a reservoir (13) for particulate polymeric material and oil, more specifically a reservoir for oil-wet particulate polymeric material. The Figure shows a second inlet (14) for oil and/or an intermediary pyrolysis fluid (41b), which is preferably arranged at a location below the fluid surface of the reservoir (13) for oil-wet particulate polymeric material. FIG. 1 shows one or more oil level sensors (16), here with two oil level sensors (16a, 16b), for controlling an oil level in said reservoir (13). The Figure shows one or more first heating elements (15), in an embodiment of a heat tracing cable, for heating said reservoir (13) and its content, and one or more temperature sensors (19), for controlling said one or more first heating elements (15) to achieve and maintain a desired temperature of said reservoir (13) content.

FIG. 1 shows one or more feeder auger (22) arranged in a feeder gutter portion (23), at the bottom of the feeder unit (10), arranged such that said reservoir is feeding oil-wet particular polymeric material to said one or more feeder auger (22) by gravity. The Figure shows that said one or more feeder auger (22) is driven by one or more drive motor (21) for feeder auger (22), and that said one or more feeder auger (22) is arranged to transport said oil-wet particular polymeric material into a narrowing pipe portion (24) leading to a compacting pipe (26), wherein said oil-wet particulate polymeric material is squeezed into a compacted oil-wet particulate polymeric material before being injected into a pyrolysis reactor (3). Part of the oil of the oil-wet particulate polymeric material may be squeezed back out of the compacting mass during the passage in the narrowing pipe portion (24) before entering the compacting pipe (26) and remain in the reservoir (13). The FIG. 1 shows also that one or more second heating elements (28) arranged on said compacting pipe (26) for pre-heating said compacted oil-wet particulate polymeric material before injection to said pyrolysis reactor (3). Said second heating elements (28) are controlled by one or more temperature sensors (19) for achieving and maintaining desired temperature of said compacted oil-wet polymeric material (not shown on the Figure). I an embodiment of the invention said narrowing pipe portion (24) is made in a material low thermal conductivity such as stainless steel in order to reduce heat transfer from the compacting pipe (26) back to the reservoir (13). FIG. 1 shows a first tilt system (29) for adjusting the inclination of said feeder gutter portion (23).

Figure 2:
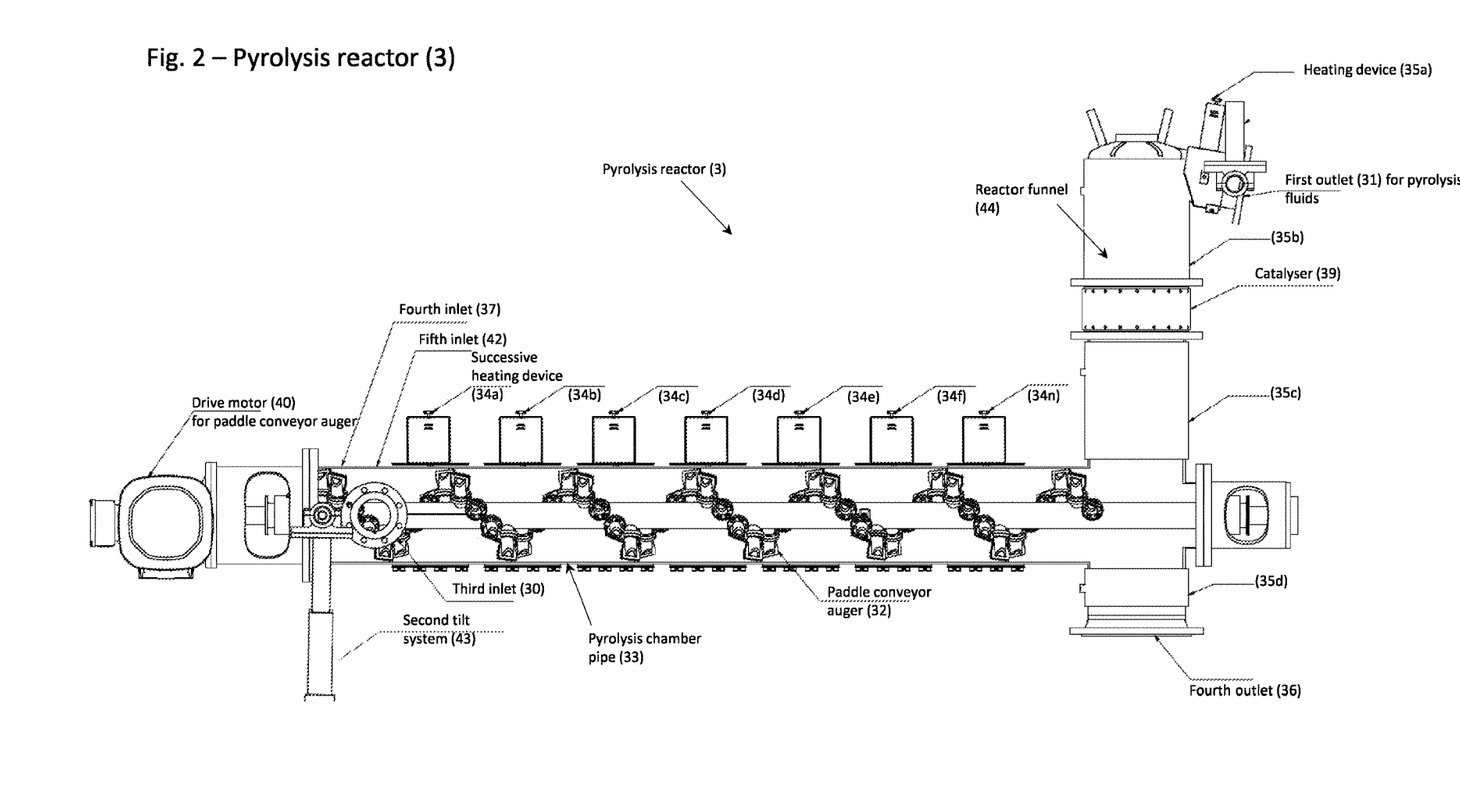
FIG. 2 is a longitudinal section and view of an embodiment of a pyrolysis reactor for plastic or rubber waste material from a pyrolysis injector.

FIG. 2 is a longitudinal section and view of an embodiment of a pyrolysis reactor (3) for pyrolyzing said compacted oil-wet particulate polymeric material. The Figure shows an embodiment of the invention wherein the pyrolysis reactor (3) comprises:
  a pyrolysis chamber pipe (33)
  a paddle conveyor auger (32)
  said third inlet (30)
  a drive motor (40) for said paddle conveyor auger (32)
  a fourth inlet (37) for receiving all or a part of a first pyrolysis fluid (41c)
  a fifth inlet (42) for receiving a part of an intermediary pyrolysis fluid (41b)
  one ore more successive heating devices (34a, b, c, d, e, f, n, . . . )
  a reactor funnel (44) with;
  said first outlet (31) for pyrolysis fluids (41a, 41b, 41c)
  one or more heating devices (35a, b, c, d, . . . )
  a fourth outlet (36) for solids,
  a catalyzer (39).

In an embodiment of the invention said paddle conveyor auger (32), driven by a drive motor (40), form a pyrolysis rotatable mandrel with helically arranged arms with dual conveyor blades arranged with small separation to the pyrolysis chamber pipe (33) inner wall. In this configuration, the injected compacted oil-wet particular polymeric material which is injected at inlet (30), the injected part of said intermediary pyrolysis fluid (41b) in condensed state is at inlet (42) and the injected part of said first pyrolysis fluid (41c) in condensed state is at inlet (37), which are all mixed and smeared by the conveyor auger (32) successively along the inner wall of the pyrolysis chamber pipe (33) thus exposing the mass efficiently to the inner wall heated by the heat sources (34a, 34b, . . . , 34N) and transforming the injected materials into pyrolysis fluids (41a, 41b, 41c) in gaseous form, such that the pyrolysis fluids (41a, 41b, 41c) are vaporized upwards through a reactor funnel (44) and leading to a first outlet (31) for said pyrolysis fluids (41a, 41b, 41c) in gaseous form. In an embodiment of the invention the reactor funnel (44) comprises one or more heating devices (35a, 35b, 35c, 35d) for maintaining desired temperature and to keep pyrolysis fluids (41a, 41b, 41c) in gaseous form. In this configuration the reactor funnel (44) comprises a catalyser (39), such that pyrolysis fluids (41a, 41b, 41c) in gaseous form may decrease their carbon chain lengths, and thus form shorter carbon chain lengths and thus into higher quality petroleum products. The Figure also shows a second tilt system (43) to adjust an inclination of said pyrolysis chamber (33), such a feature is basically for aligning the third inlet (30) to the corresponding pyrolysis injector (1) first tilt system (29), but may also be used to adjust the transport rate of pyrolyzing material along the pyrolysis chamber pipe (33). The FIG. 2 shows further a fourth outlet (36), for solids and non pyrolyzed products, arranged at the opposite end of said pyrolysis chamber pipe (33) relative to said first outlet (31).

Figure 3:
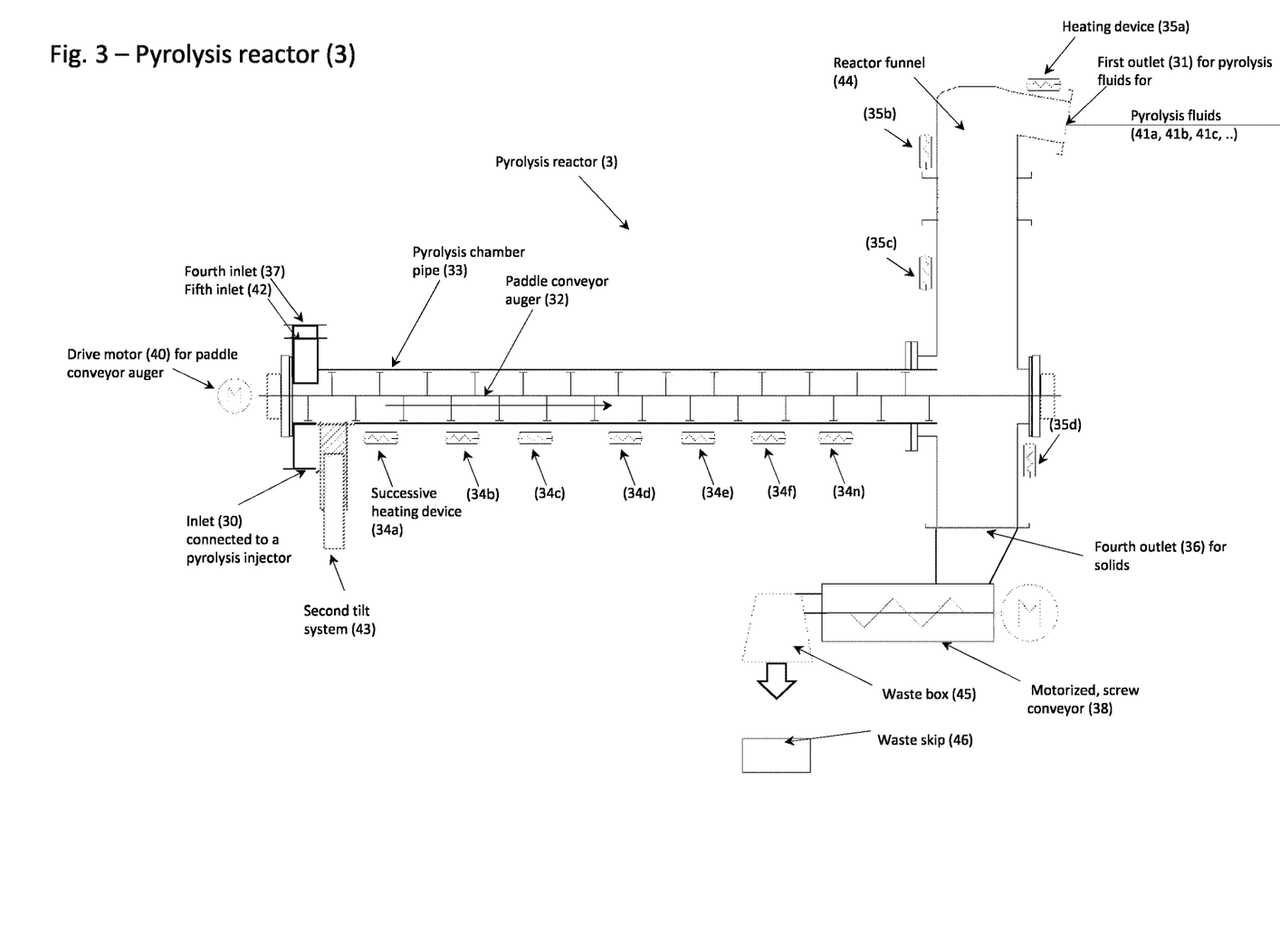
FIG. 3 is a schematic section of an embodiment of a pyrolysis reactor for plastic or rubber waste material from a pyrolysis injector and further comprising a treatment system after an outlet for solids.

FIG. 3 is a schematic illustration of a pyrolysis reactor (3) used in the invention comprising a third inlet (30) for pre-heated compacted oil-wet polymeric material from the pyrolysis injector (1), a fourth and a fifth inlet (37, 42) for pyrolysis fluids (41b, 41c) from the condensers (50, 60) in condensed form to a pyrolysis chamber pipe (33), the pyrolysis chamber pipe (33) comprising successive heating elements (34a, 34b, . . . 34n) for successively heating the material in the pyrolysis chamber pipe (33) leading to a first outlet (31) for resulting pyrolyzed fluids on gas form. In an embodiment of the invention an axially arranged paddle conveyor auger (32) is arranged in the pyrolysis chamber pipe (33) driven by a motor (40). In an embodiment of the invention there are one or more heating devices (35a, 35b, 35c, 35d) arranged on a reactor funnel (44) arranged at a end of the pyrolysis chamber pipe (33) and leading to said first outlet (31) for pyrolysis fluids (41a, 42b, 41b), said one or more heating devices (35a, 35b, 35c, 35d) are arranged for maintaining the pyrolysis fluids (41a, 41b, 41c) in gaseous form. FIG. 3 shows an outlet (36) for solids on a lower end of said reactor funnel (44) arranged such that solids, such as ash and non treatable material, will fall into a motorized, screw conveyor (38) by gravity and said motorized, screw conveyor (38) are further connected waste box (35). The figure illustrates an embodiment of the invention that the waste box (45) can be unloaded to a waste skip (46). The Figure shows a second tilt system (43) arranged for adjusting the inclination of said pyrolysis chamber pipe (33).

Figure 4:
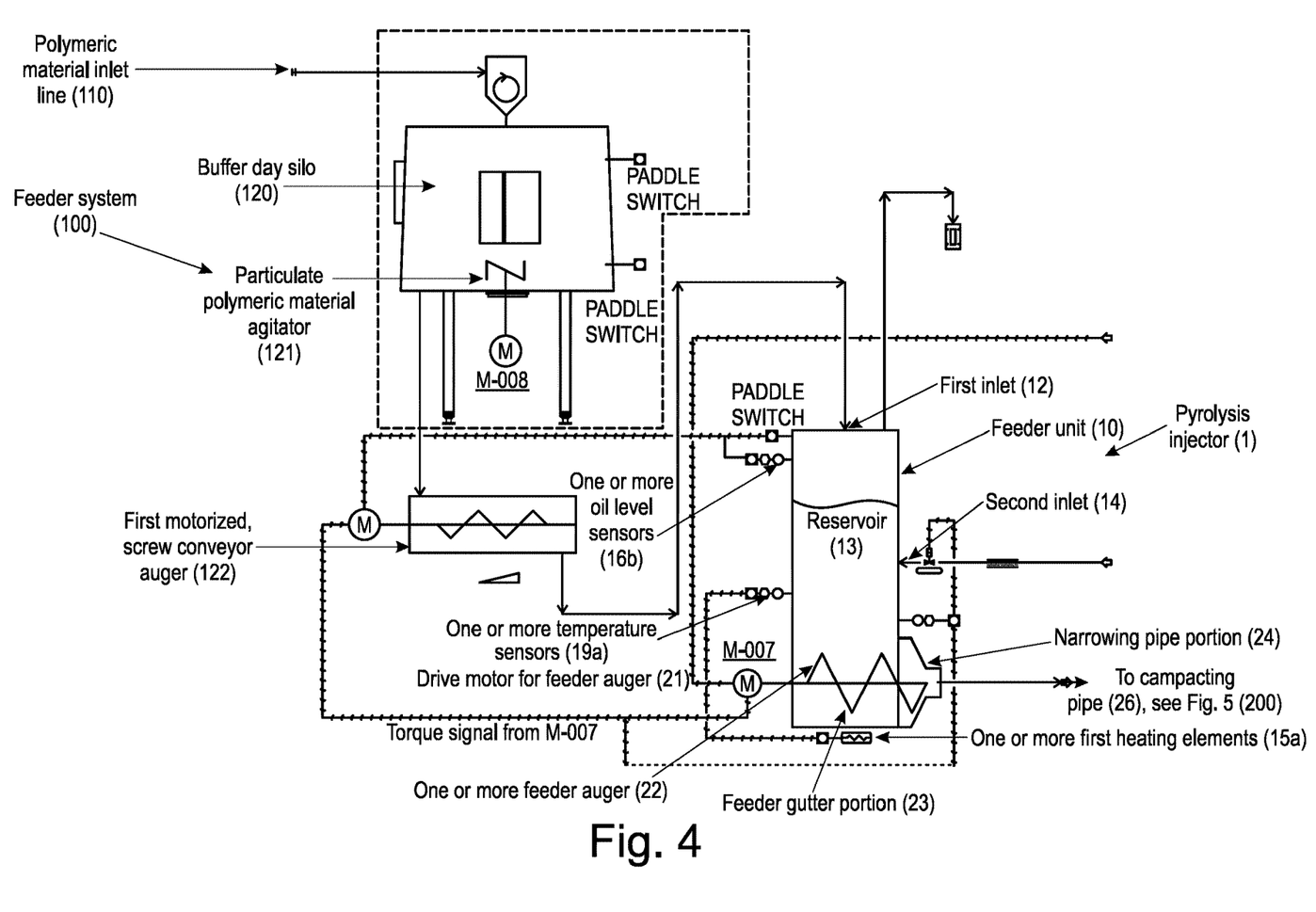
FIG. 4 is a diagrammatic illustration of a feeder system for a pyrolysis injector.

FIG. 4 diagrammatically shows a feeder system (100) for the pyrolysis injector (1), comprising a polymeric material inlet line (110), for providing particulate polymeric material to a buffer day silo (120) with a particulate polymeric material agitator (121) and a first motorized, screw conveyor auger (122) for conveying said particulate polymeric material to a first inlet (12) of a pyrolysis injector (1). In an embodiment of the invention said pyrolysis injector (1) comprises said first inlet (12) leading to a reservoir (13) of a feeder unit (10), wherein said particulate polymeric material is mixed with oil to an oil-wet particulate polymeric material, led to a feeder gutter portion (23) arranged in a lower portion of said feeder unit (10), whereby one or more feeder auger (22) is arranged for conveying said oil-wet particulate polymeric material into a narrowing pipe portion (24) leading to a compacting pipe (26), for compacting said oil-wet particulate polymeric material into compacted oil-wet polymeric material for injection to the pyrolysis reactor (3).

Figure 5:
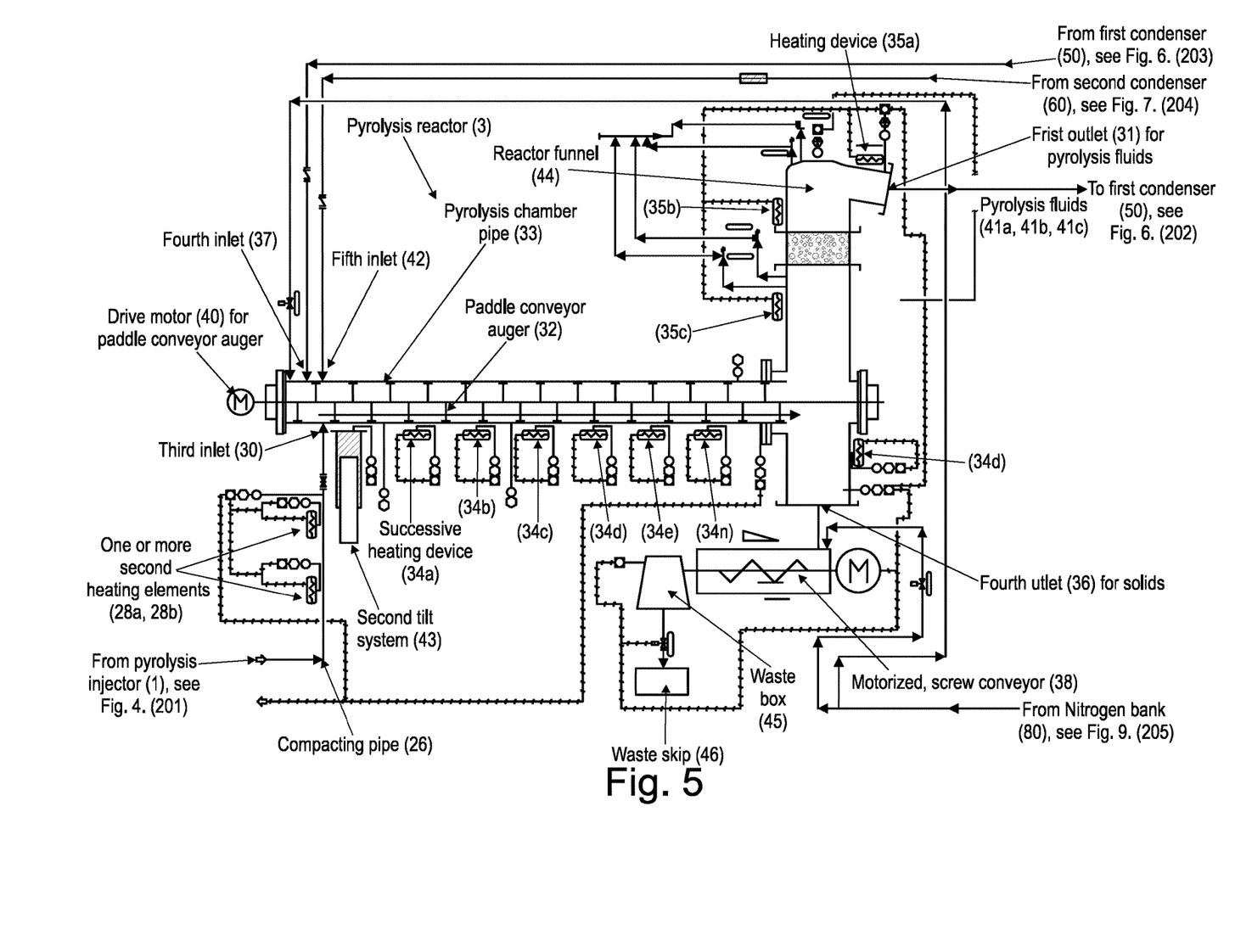
FIG. 5 is a diagrammatic illustration of a pyrolysis reactor comprising an inlet to a pyrolysis chamber pipe and a reactor funnel to an outlet for pyrolysis gases to a first condenser.

FIG. 5 diagrammatically shows a pyrolysis reactor system for the pyrolysis reactor (3) comprising an inlet line from the pyrolysis injector (1) to a compacting pipe, wherein said compacted oil-wet polymeric material is pre-heated by one or more second heating elements (28a, 28b) before being injected into a third inlet (30) to said pyrolysis reactor (3). FIG. 5 shows a paddle conveyor (32) arranged in a pyrolysis chamber pipe (33) and driven by a motor (40), for smearing and transporting said compacted oil-wet particulate polymeric material along an inner wall of said pyrolysis chamber pipe (33) with successively arranged heating devices (35a, 35b, 35c, 35e, 34n) for successive heating said smeared compacted oil-wet particulate polymeric material and pyrolyze all or a part of it into pyrolysis fluids (41a, 41b, 41c) in gaseous form and led to a first condenser (50) for condensing a first pyrolysis fluid (41c). FIG. 5 shows also a line connected to a inert gas bank (90).

Figure 6:
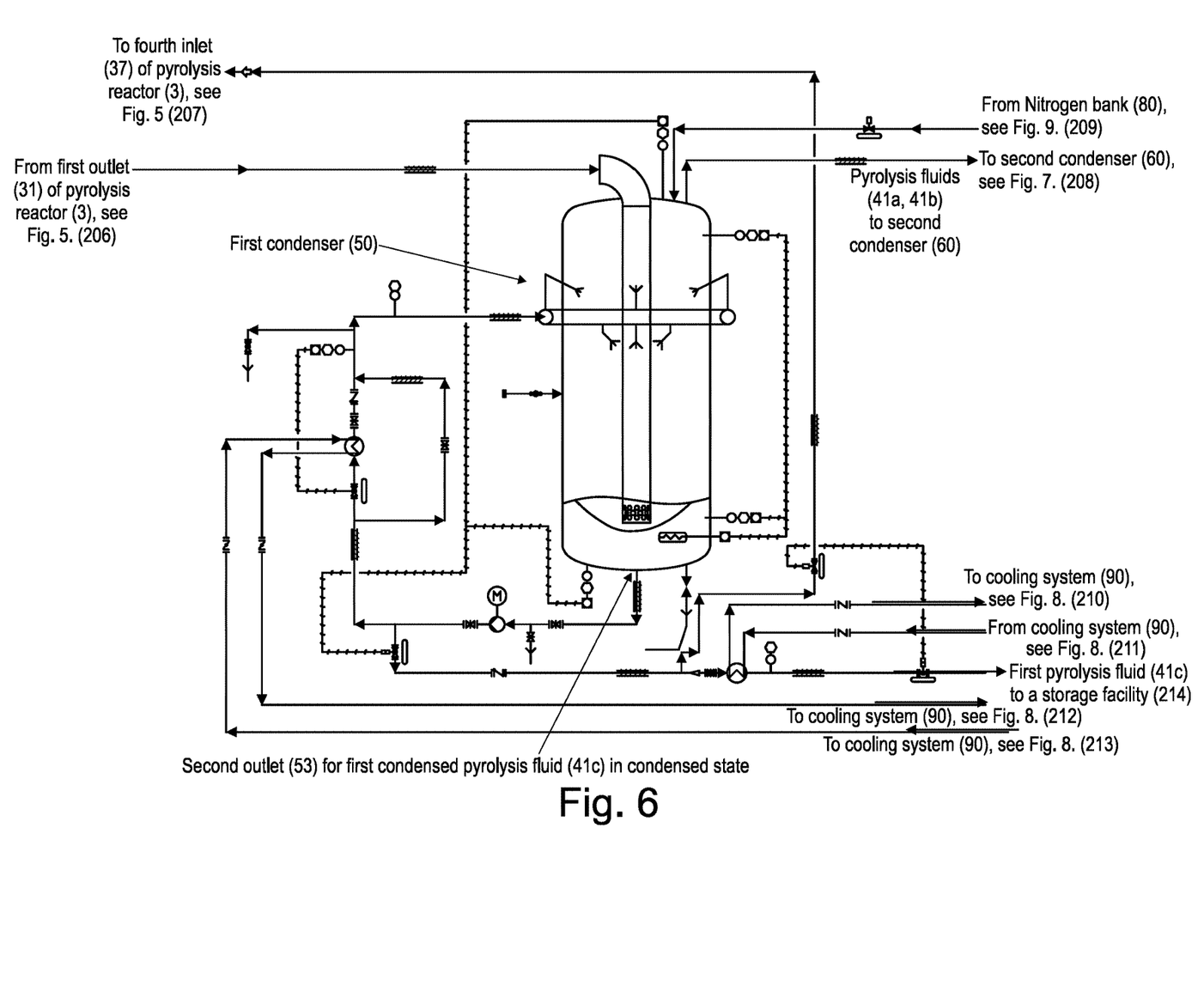
FIG. 6 is a diagrammatic illustration of a first condenser receiving gases from an outlet from a pyrolysis process.

FIG. 6 is a diagrammatic illustration of a first condenser (50) receiving gases from the first outlet (31) for pyrolysis fluids (41a, 41b, 41c) from the pyrolysis reactor (3), said pyrolysis fluids (41a, 41b, 41c) are led to the first condenser (50) wherein a first pyrolysis fluid (41a) is transformed into a condensed state and led out through a second outlet (53). Remaining gases from the receiving gases for pyrolysis fluids (41a, 41b) are led to a second condenser (60). The FIG. 6 shows a line from the second outlet (53) which is further split into a first line to a first pyrolysis storage facility and a second line which leads back to said pyrolysis reactor (3) for injection of said first pyrolysis fluid (41c) into said fourth inlet (37) of said pyrolysis reactor (3). FIG. 6 further shows an interconnection with a cooling system (90) and a inert gas bank (80).

Figure 7:
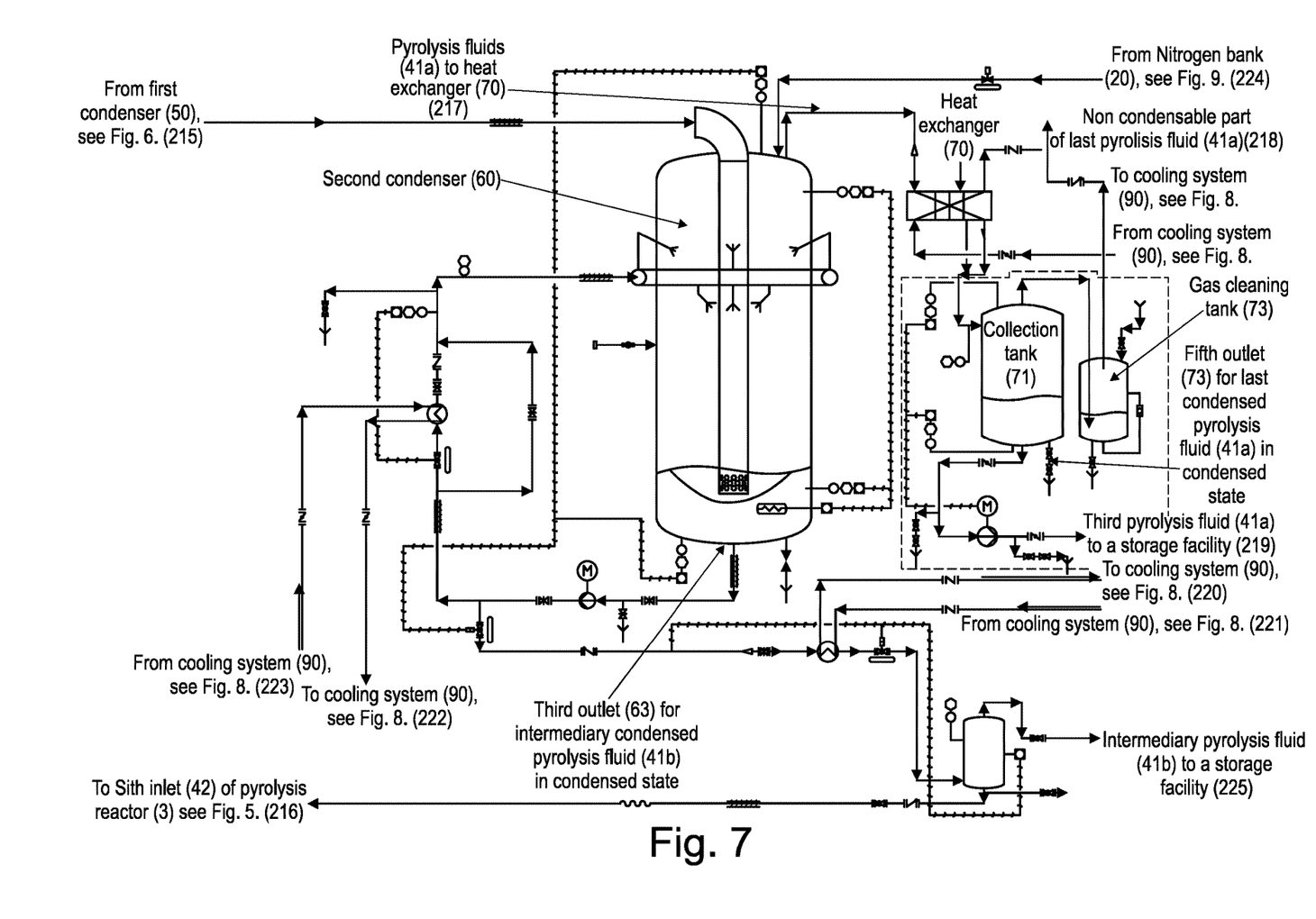
FIG. 7 is a diagrammatic illustration of a second condenser arranged with an inlet pipe for receiving non-condensed gases from a first condenser.

FIG. 7 is a diagrammatic illustration of a second condenser (60) arranged with an inlet line (215) for receiving non-condensed gases from the first condenser (50). The second condenser is provided with a third outlet (63) for intermediate pyrolysis fluid (41b) for return in a partially cooled state back to said condensed oil injection inlet (14) of the injector (1)'s reservoir (13). The second condenser (60) is further connected to a heat exchanger (70) for further condensing part of a third pyrolysis fluid (41a) with short-molecular length carbon molecules gas. Some of the short-molecular length gas is non-condensable in the present context and may be burned or otherwise converted for providing electrical or heat energy to run part or all of the present process.

Figure 8:
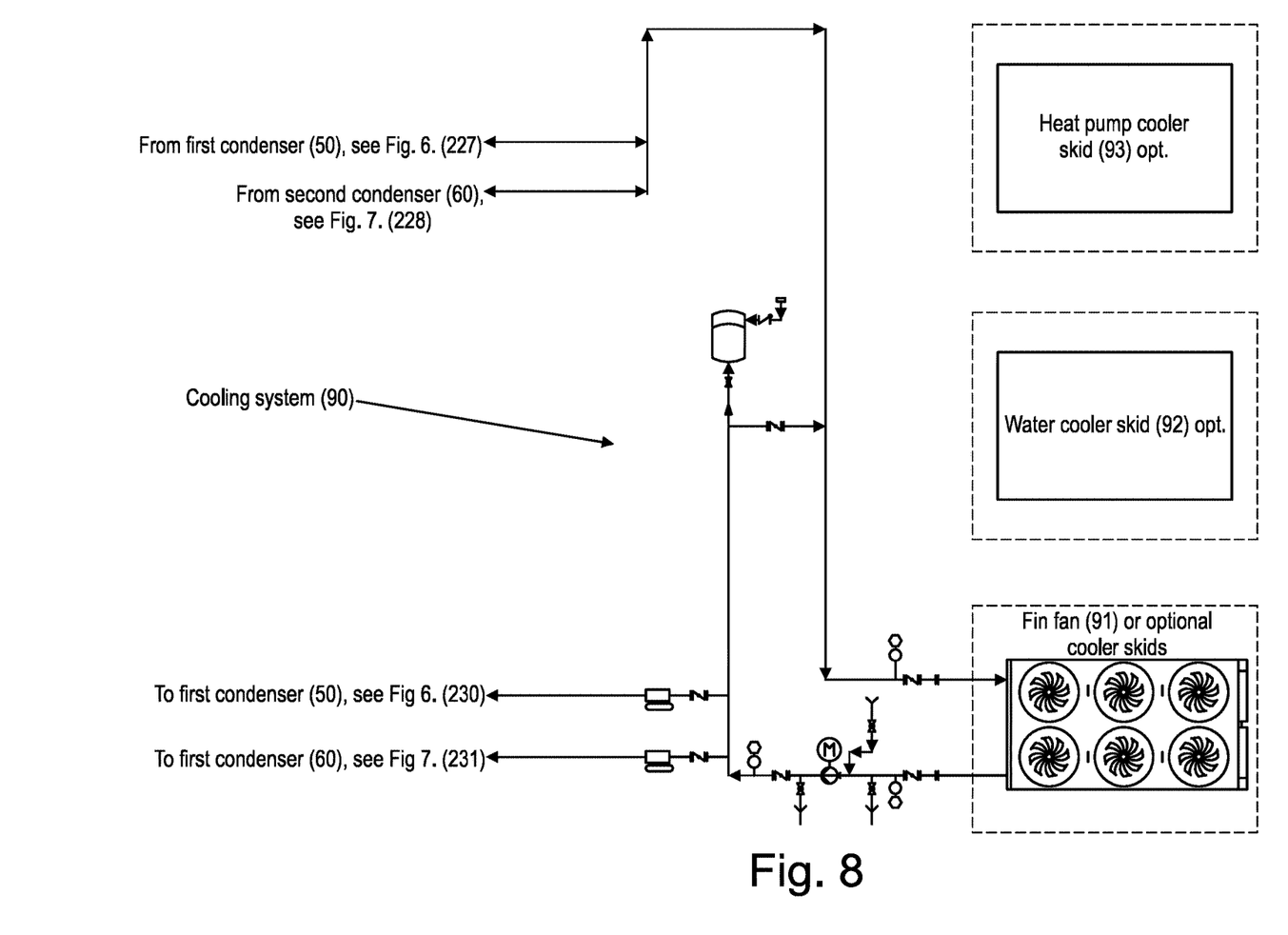
FIG. 8 is a diagrammatic illustration of a cooling system for a pyrolysis apparatus.

FIG. 8 is a diagrammatic illustration of a cooling system (90) comprising a fin fan (91), or optionally a water cooler skid (92), or optionally a heat pump cooler skid (93) as cooling source, and lines (227, 228, 230,231) for connection to a first and second condenser (50,60).

Figure 9:
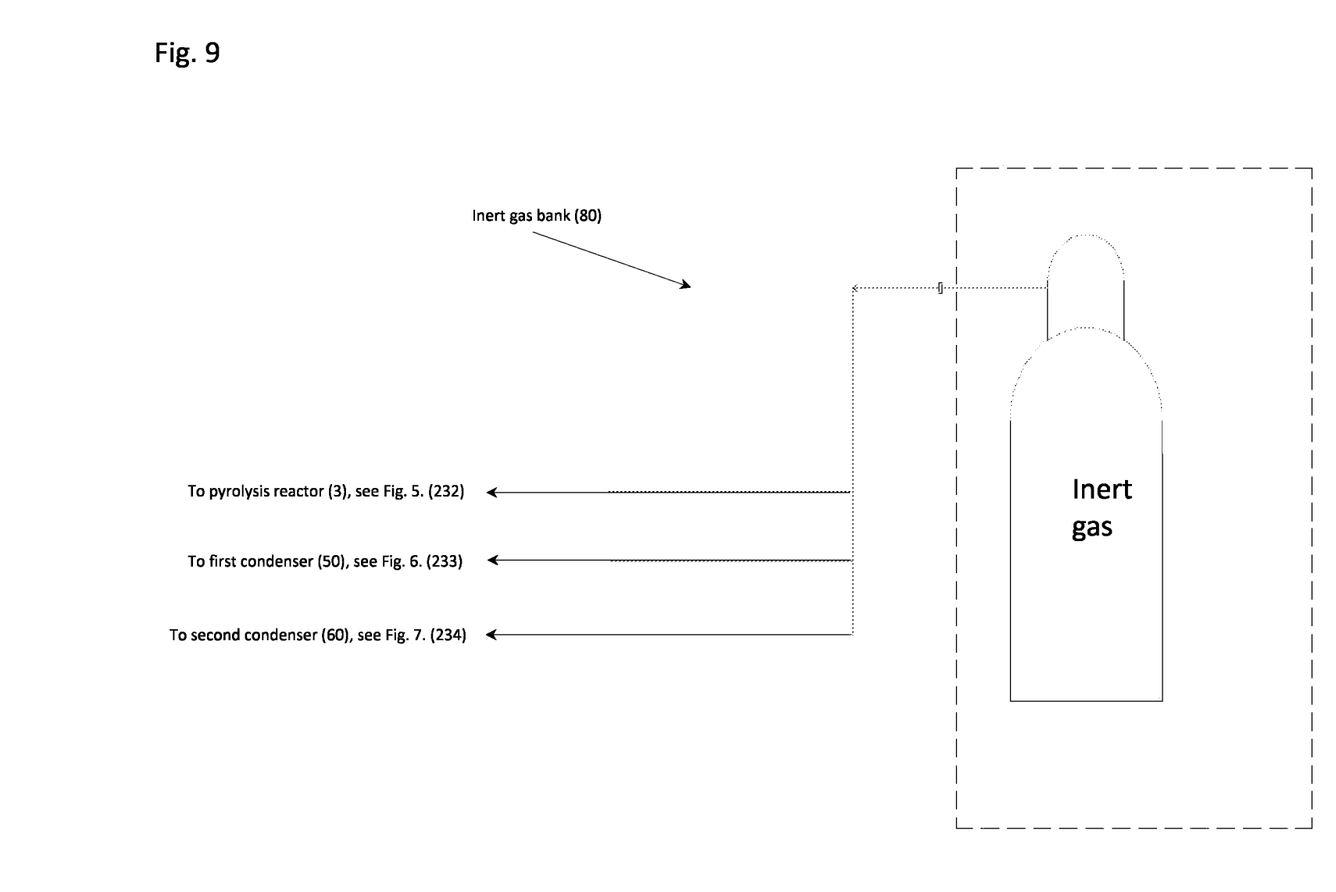
FIG. 9 is a diagrammatic illustration of a inert gas bank for a pyrolysis apparatus.

FIG. 9 is a diagrammatic illustration of a inert gas bank (80) and lines (232, 233, 234) connected to a pyrolysis reactor (3), a first and second condenser (50, 60).

According to the invention, the pyrolysis injector (1) provides:

a feeder unit (10) with a first inlet (12) for particulate polymeric material and a second inlet (14) for oil, wherein said first inlet (12) and said second inlet (14) lead to a reservoir (13) arranged for mixing said particulate polymeric material and oil into oil-wet particulate polymeric material, and with one or more feeding auger (22) arranged in a feeder gutter portion (23) of said reservoir (13), said feeder gutter portion (23) leading to a narrowing pipe portion (24) about an end portion of said one or more feeder auger (22) arranged for compacting said oil-wet particulate polymeric material for forming a compacted oil-wet particulate polymeric material, said narrowing pipe portion (24) leading to a compacting pipe (26) which is arranged for feeding said compacted oil-wet particulate polymeric material to a third inlet (30) of a pyrolysis reactor (3), said pyrolysis reactor (3) provided with at least one first outlet (31) for pyrolysis fluids (41a, 41b, 41c) in gaseous form, one or more first heating elements (15) arranged for heating said reservoir (13) with said oil-wet particulate polymeric material (and oil) present therein, and for boiling off water and/or chemicals, one or more second heating elements (28) arranged on said compacting pipe (26) with said compacted oil-wet particulate polymeric material and arranged for pre-heating said compacted oil-wet particulate polymeric material before injection to said third inlet (30) of said pyrolysis reactor (3), and wherein said second inlet (14) for oil is arranged for receiving a part of an intermediary pyrolysis fluid (41b) of said pyrolysis fluids (41a, 41b, 41c) in a condensed liquid state back to said reservoir (13).

In an embodiment the invention provides a pyrolysis injector (1), i.e. an injector (1) for waste particulate polymeric material to a pyrolysis reactor (3), the pyrolysis injector (1) comprising:

a feeder unit (10) with an inlet (12) for particulate polymeric material, such as fragments of plastic and or rubber waste material, please see FIG. 1 and supported by FIG. 4, wherein said waste material inlet (12) leads to an reservoir (13) with at least one feeding auger (22), preferably a submerged, motorized feeding auger, arranged in a feeder gutter portion (23) of said reservoir (13), please see the generally horizontally arranged submerged, feeding auger (22) driven by drive motor (21) in FIG. 1, said feeder gutter portion (23) leading to a narrowing pipe portion (24) about an end portion of said one or more feeder auger (22), please see FIG. 1 for an illustration of such an arrangement, arranged for compacting said oil-wet particulate polymeric material for form a compacted oil-wet particulate polymeric material, FIG. 1 shows an illustration of how said compacted oil-wet particulate polymeric material is aligned in a compacting pipe (26) and may work as an air lock between said pyrolysis reactor (3) and said reservoir (13), said narrowing pipe portion (24) leading to a compacting pipe (26) which is arranged for feeding said compacted oil-wet particulate polymeric material to a third inlet (30) of a pyrolysis reactor (3), said pyrolysis reactor (3) provided with at least one first outlet (31) for pyrolysis fluids (41a, 41b, 41c) in gaseous form, one or more first heating elements (15) arranged for heating said reservoir (13) with said oil-wet particulate polymeric material and oil present therein, and for boiling off water and/or chemicals, one or more second heating elements (28) arranged on said compacting pipe (26) with said compacted oil-wet particulate polymeric material and arranged for pre-heating said compacted oil-wet particulate polymeric material before injection to said third inlet (30) of said pyrolysis reactor (3), and wherein said second inlet (14) for oil is arranged for receiving a part of an intermediary pyrolysis fluid (41b) of said pyrolysis fluids (41a, 41b, 41c) in a condensed liquid state back to said reservoir (13).

The present invention relates to a pyrolysis injector which is suitable for feeding a pyrolysis reactor with pre-heated compacted oil-wet particulate polymeric material with decreased content of air and chemicals.

According to the invention, the reservoir may have a temperature up to and above the boiling point of water, approximately 100° C., in order to boil off water before entering the compacting pipe. Moreover, the temperature of the reservoir is preferably below 106° C. in order to prevent premature melting of some particulate polymeric material. Such a pre-heating will provide gaseous form of part of water and chemicals, undesired chemicals such as chlorine compounds or hydrochloric acid present in feed of the particulate polymeric material. The water and chemicals may therefor vaporize at the reservoir. The reservoir will also work as a first airlock device for the pyrolysis reactor chamber.

According to the invention, the compacting pipe is arranged with one or more second heating elements for pre-heating said compacted oil-wet particulate polymeric material before injection to the third inlet of the pyrolysis reactor. The temperature of pre-heating is arranged for heating the compacted oil-wet particulate polymeric material up to 200° C. or more. Such a pre-heating will increase the efficiency of the pyrolysis reactor, thus enable the system to extract higher quality petroleum products from said particulate polymeric material. The compacting pipe will also work as a second airlock in line with said first airlock for the pyrolysis reactor chamber.

According to an embodiment of the invention, part of said intermediary pyrolysis fluid (41b) is returned to said second inlet (14) for oil comprising carbon chains of length 13 to 20 carbon atoms. The oil so supplied is for maintaining a sufficient surface level of the reservoir (13). The oil so supplied will significantly reduce the need for externally supplied oil to the reservoir (13), thus reducing costs and logistics need. Reinjection of this intermediary pyrolysis fluid (41b) may result in re-pyrolyzed carbon chains of reduced length, thus more lighter oil and/or gas, that may be more valuable in the market and/or provide cleaner combustion.

According to an embodiment of the invention, said feeder unit (10) is arranged with one or more oil level sensors (16) arranged for controlling an oil level of said reservoir (13) e.g. one pressure transmitter or alternative an first level sensor (16) and a second level sensor (18), to control the oil level in said reservoir (13). The oil filling through said second inlet (14) for oil may be controlled by a valve, which is motorized magnetically, pneumatically or mechanically and controlled for opening and closing based on signals from said one or more oil sensors (16).

According to an embodiment of the invention, said feeder unit (10) is arranged with one or more temperature sensors (19) for controlling a temperature of said first heating element (15) of said reservoir (13) and/or for said one or more second heating elements (28) for said compacting pipe (26). The first heater element (15) may in an embodiment of the invention a so-called electrical heating cable and the second heater element (28) may in an embodiment of the invention be a so-called ceramic heater and/or tube heaters.

According to an embodiment of the invention, said feeder unit (10) is arranged with an outlet duct, for venting off said boiled off water and/or chemicals, and arranged with a filter for removing or absorbing vaporized chemicals and/or fluctuating hydrocarbons or carbon atoms. Said filter may be an activated carbon filter.

According to an embodiment of the invention, said pyrolysis injector (1) is arranged with a first tilt system (29) for adjusting the inclination of said feeder gutter portion (23) and thus the inclination of said feeding auger (22) and the compacting pipe (26), such that a feeding rate of the compacted oil-wet particulate polymeric material to the pyrolysis reactor is based on the inclination of said feeder gutter portion (23).

In another aspect, the invention is a pyrolysis reactor (3) provides,
 a pyrolysis injector, preferably a pyrolysis injector (1) according to the invention,
 a pyrolysis chamber pipe (33) enveloping a paddle conveyor auger (32), arranged for conveying and pyrolyzing feed of said compacted oil-wet particulate polymeric materials, from said third inlet (30) connected to said pyrolysis injector (1), into said pyrolysis fluids (41a, 41b, 41c),
 at least one first outlet (31) for said pyrolysis fluids (41a, 41b, 41c), of increasing carbon chain lengths (41a<41b<41c), which is further connected to a first condenser (50) for condensing a first pyrolysis fluid (41c) of said pyrolysis fluids (41a, 41b, 41c), and
 a fourth inlet (39) for receiving at least part of said first pyrolysis fluid (41c), arranged near said third inlet (30) on said pyrolysis reactor (3), for receiving all or part of said first pyrolysis fluid (41c) in a condensed state from a second outlet (53) for said condensed first pyrolysis fluid (41c) on said first condenser (50).

The paddle conveyor auger (32) may comprise a rotatable mandrel with helically arranged arms with dual conveyor blades arranged with small separation to the pyrolysis chamber pipe (33) wall. In this configuration, the injected compacted oil-wet fragments which are injected at inlet (30) are smeared successively along the inner wall of the pyrolysis chamber pipe (33) thus exposing the mass efficiently along the inner wall of the chamber pipe (33) heated by the heat sources (34a, 34b, . . . , 34N). The pyrolysis fluids (41a, 41b, 41c) have increasing carbon chain length, said first pyrolysis fluid (41c) have longer chains than said intermediary pyrolysis fluid (41b) and said intermediary pyrolysis fluid (41b) have longer carbon chains than a third pyrolysis fluid (41a). The boiling point increases with increasing molecular size. As the length of the carbon chain increases, the higher the boiling point will be. Longer chain hydrocarbons are thus less volatile, so they do not evaporate as easily as shorter chains.

The first condenser is arranged for condensing said first pyrolysis fluid (41c) with longest carbon chains and preferably boiling off carbon chains up to 20 carbon atoms, preferably at a temperature about 345° C. The fourth inlet (39) for receiving said first pyrolysis fluid (41c) is preferably arranged at the beginning of said paddle conveyor auger (32) of said pyrolysis reactor (3), such that the returning first pyrolysis fluid (41c) is fed at the beginning of said pyrolysis reactor (3), on par with said compacted oil-wet particulate polymeric material feed through third inlet (30). Reinjection of the first pyrolysis fluid (41c) may result in re-pyrolyzing into carbon chains of reduced length, thus more lighter oil and/or gas, that may be more valuable in the market and are more environmentally to use in combustion.

According to an embodiment of the invention, said first pyrolysis fluid (41c) comprises carbon chains of a length above 20 carbon atoms.

According to an embodiment of the invention, said first condenser (50) is further connected to a second condenser (60) for condensing an intermediary pyrolysis fluid (41b) of said pyrolysis fluids (41a, 41b, 41c).

The second condenser is arranged for condensing an intermediary pyrolysis fluid (41b) preferably with carbon chain lengths from 13 to 20 carbon atoms, preferably at a temperature about 218° C. In an embodiment of the invention said first and second condensers (50, 60) are arranged with heating elements to maintain temperature of condensate in said condensers (50, 60).

According to an embodiment of the invention, said second condenser (60) comprises a third outlet (63) arranged for its intermediary of condensed pyrolysis fluid (41*b*), and wherein said third outlet (63) is further connected to said second inlet (14) of said pyrolysis injector (1). This part of returning intermediary pyrolysis fluid (41*b*) preferably needs to be cooled down to about 105° C. before injecting at said second inlet (14), to keep same temperature as in the reservoir (13). The advantages of cooling just generally same temperature is twofold;
- avoiding cooling to much thus requiring heating at reservoir (13),
- avoiding cooling to little thus incurring partial melting thus clogging in the reservoir (13).

According to an embodiment of the invention, said third outlet (63) is further connected to a fifth inlet (42), arranged near said third inlet (30) to said pyrolysis reactor (3), for receiving all or part of said intermediary pyrolysis fluid (41*b*) in a condensed state from said third outlet (63) for said condensed intermediary pyrolysis fluid (41*b*) on said second condenser (60). This part of returning intermediary pyrolysis fluid (41*b*) is not required to cool before injection as the temperature of the pyrolysis chamber pipe (33) shall be above the fifth inlet (42) temperature. An advantages of this absence of cooling of that part of the intermediary pyrolysis fluid (41*b*), is to avoid of cost of unnecessarily reheating it in said pyrolysis reactor (3).

According to an embodiment of the invention, said second condenser (60) is further connected to a heat exchanger (70) for condensing a condensable part of a third pyrolysis fluid (41*a*) of said pyrolysis fluids (41*a*, 41*b*, 41*c*) to a collection tank (71) for said condensable part of said third pyrolysis fluid (41*a*).

The heat exchanger is arranged for condensing said third pyrolysis fluid (41*c*) preferably with carbon chain lengths up 13 carbon atoms. In an embodiment of the invention said heat exchanger is a plate type heat exchanger.

According to an embodiment of the invention, said collection tank (71) is further connected to a gas cleaning tank (74) for scrubbing a non condensable part of said third pyrolysis fluid (41*a*).

According to an embodiment of the invention, said non condensable part of said third pyrolysis fluid (41*a*) is used for providing all or part of electrical energy required to run said pyrolysis reactor (3) and energy consumption related to the pyrolysis process.

In an embodiment of the invention, said non condensable part is used as fuel at a waste incinerator to produce steam for either directly heating at the pyrolysis injector (1) and/or the pyrolysis reactor (3) and/or to a steam generator for production of electricity. In a further embodiment of the invention, said steam generator may have a capacity to produce sufficient electricity (effect) to run both the pyrolysis injector (1) and the pyrolysis reactor (3). In an even further embodiment of the invention, said steam generator may have a capacity to produce enough electricity (effect) to run all energy requiring components used in a pyrolysis process, depending on the composition of the polymeric material and the degree of pyrolysis.

According to an embodiment of the invention, said third pyrolysis fluid (41*a*) comprises carbon chain length less than 13 carbon atoms, preferably with a boiling point less than 218° C.

According to an embodiment of the invention, said pyrolysis chamber pipe (33) is arranged with successive heating devices (34*a*, 34*b*, 34*c*, 34*n*, . . . ), for successively heating said pyrolysis chamber pipe (33) in order to successively transforming said compacted oil-wet fragments into said pyrolysis fluids (41*a*, 41*b*, 41*c*).

According to an embodiment of the invention, said at least one gas outlet (31) may be arranged with one or more heating devices (35*a*, 35*b*, 35*c*, 35*n*, . . . ), for maintaining an above-boiling temperature of the pyrolysis fluids (41*a*, 41*b*, 41*c*, . . . ).

According to an embodiment of the invention, said pyrolysis reactor (3) is arranged with a fourth outlet (36) for solids, which further comprises an air proof path to a screw conveyor (38) which is further connected to a waste box (45).

In an embodiment of the invention, said screw conveyor (38) is preferably an extruder type, arranged as an airlock, such that the air will not return back into the pyrolysis reactor (3) from the waste box (45).

In an embodiment of the invention, the waste box (45) is arranged to stop the screw conveyor (38) when the waste box (45) needs to be emptied, to avoid air into the system. The waste box (45) will empty the solids preferably to a waste skip (46) for easy removing the solids to a depot. Herein are solids referred to as typical ash or non pyrolysable products from the pyrolysis reactor (3).

According to an embodiment of the invention, said pyrolysis chamber pipe (33) is arranged with a second tilt system (43) for adjusting the inclination of said pyrolysis chamber pipe (33).

In an embodiment of the invention, said pyrolysis chamber pipe (33) may have an adjustable inclination angle up to 5 degrees.

In an embodiment of the invention, said pyrolysis chamber pipe (33), said first condenser (50), said second condenser (60) and said screw conveyor (38) are connected to a inert gas bank (80), for inert gas purging, such an embodiment prevents oxygen to take place in the process during start up and to remove hydrocarbons at shut down, in order to prevent explosion risks.

According to an embodiment of the invention, said first condenser (50), said second condenser (60) and said heat exchanger (70) are connected to a cooling system (90) comprising a fin fan (91) and/or a water cooler skid (92) and/or a heat pump cooler skid (93).

In an embodiment of the invention said cooling system (90) is arranged for cooling of condensate from condensers (50, 60) which further connected to storage tanks.

According to an embodiment of the invention, said cooling system (90) returns heat to said first and/or second condenser (50, 60) to maintain a temperature in said first and/or second condenser (50, 60).

In an embodiment of the invention said cooling system (90) is returns heat to condensate which are recycling in said condensers (50, 60) to maintain desired temperatures in the condensers (50, 60) itself.

According to an embodiment of the invention, a vessel comprising a pyrolysis injector according to the invention, a pyrolysis reactor according to the invention, or a pyrolysis apparatus according to the invention.

One of the benefits with said reservoir include that water and other chemicals, e.g. undesired chemicals such as chlorine, are efficiently boiled off before entering said pyrolysis reactor. The reservoir, in combination with the compactor pipe, will also function as an airlock for the compacted hot and oil-wet de-watered plug forming mass of particulate polymeric material, before the compacted mass of particulate polymeric material is forced into said pyrolysis reactor which thus operates without letting in air via said injector thus operating in mainly oxygen free condition. Air inlet via other entries is also avoided.

Said pyrolysis reactor may extract oils with different qualities, the longer carbon chain length the poorer quality, from said pre-heated compacted oil-wet particulate polymeric material and returning part of a condensed, middle oil quality, carbon chain length between 13 to 20 carbon atoms with a boiling point between 218° C. and 345° C., in a cooled state back to said pyrolysis injector to be resupplied to the oil in said reservoir. Such intermediate length oil may also be resupplied in un-cooled state directly back to the pyrolysis reactor. Also low quality oil, with carbon chain length more than 20 carbon atoms and boiling point higher than 345° C., resupplied in un-cooled state directly back to the pyrolysis reactor. Surprisingly, this has shown that the overall output of pyrolyzed products increases.

The returning condensed, low quality oil follow said compacted particulate polymeric material through said pyrolysis reactor again, such that the carbon chain lengths in the low quality oil can be reduced to become a higher quality petroleum products with shorter carbon chains.

The returning condensed, middle quality oil may function as pre-heating liquid for said particulate polymeric material, and a portion of said pre-heating liquid may follow said particulate polymeric material through said pyrolysis reactor again, such that said pre-heating liquid carbon chains can be reduced to become a higher quality petroleum products with shorter carbon chains, too.

The resulting intermediary oil may advantageously be sold to an oil refinery or used directly as fuel for the vessel carrying the pyrolysis apparatus such that the vessel may be self driven in collecting and processing waste plastic and rubber waste.

This is a significant environmental advantage.

The present invention also provides a process for pyrolysis of particulate polymeric material which comprises:
  providing an oil-wet particulate polymeric material in a pyrolysis injector comprising one or more heating elements;
  pre-heating the compacted oil-wet particulate polymeric material;
  injecting the pre-heated compacted oil-wet particulate polymeric material to a pyrolysis reactor comprising one or more heating devices,
  heating the pre-heated compacted oil-wet particulate polymeric material to form one or more gaseous pyrolysis products;
  withdrawing one or more gaseous pyrolysis products from the pyrolysis reactor and condensing the one or more gaseous pyrolysis products to form one or more pyrolysis liquids;
  feeding at least part of the one or more condensed pyrolysis liquids to the pyrolysis injector;
  feeding at least part of the one or more condensed pyrolysis liquids to the pyrolysis reactor.

According to an embodiment of the invention, the condensing comprises feeding the one or more gaseous pyrolysis products to one or more condensers for condensing the one or more gaseous pyrolysis products and forming one or more condensed pyrolysis fluids According to an embodiment of the invention, the process comprises a cooling system for cooling the one or more condensed pyrolysis fluids further.

According to an embodiment of the invention, the process comprises a inert gas bank for purging the pyrolysis reactor and condensers.

The process of the invention may be operated continuously. Accordingly, the process may comprise continuously injecting of the pre-heated compacted oil-wet particulate polymeric material to the pyrolysis reactor, continuously withdrawing the one or more gaseous pyrolysis products from the pyrolysis reactor, continuously feeding the one or more gaseous pyrolysis products to one or more condensers for condensing the one or more gaseous pyrolysis products and forming one or more pyrolysis fluids, and continuously feeding at least part of the one or more pyrolysis fluids to the pyrolysis injector and the pyrolysis reactor.

Small scale laboratory tests of the process according to the present invention has resulted in pyrolysis fluids (41a, 41b, 41c) of about:
  first pyrolysis fluid (41c), e.g. heavy oil=3-6%
  intermediary pyrolysis fluid (41b), e.g. diesel=60-62%
  third pyrolysis fluid (41a), e.g. naphtalene=30%
  non-pyrolysable remaining solids, e.g. ash=4-5%.

The invention claimed is:

1. A pyrolysis injector for a pyrolysis reactor comprising:
  a feeder unit with a particulate polymeric material inlet and an oil inlet, wherein said particulate polymeric material inlet and said oil inlet lead to an oil retention reservoir arranged for mixing said particulate polymeric material and oil into a mixture of oil-wet particulate polymeric material, and with one or more feeding augers arranged in a feeder gutter portion of said oil retention reservoir, said oil retention reservoir configured to retain a volume of oil having a fluid surface at a level above the feed gutter portion
  said feeder gutter portion leading to a narrowing pipe portion about an end portion of said one or more feeding augers arranged for compacting said oil-wet particulate polymeric material for forming a compacted oil-wet particulate polymeric material,
  said narrowing pipe portion leading to a compacting pipe arranged for feeding said compacted oil-wet particulate polymeric material to the pyrolysis reactor through an injector-reactor inlet,
  one or more first heating elements arranged for heating said oil retention reservoir with said mixture of oil-wet particulate polymeric material present therein, and for boiling off one or both of water and chemicals,
  one or more second heating elements arranged on said compacting pipe with said compacted oil-wet particulate polymeric material and arranged for pre-heating said compacted oil-wet particulate polymeric material before injection to said pyrolysis reactor through the injector-reactor inlet, and
  wherein said oil inlet is arranged for receiving a part of an intermediary condensed pyrolysis fluid in a condensed liquid state back to said oil retention reservoir.

2. The pyrolysis injector according to claim 1, wherein said intermediary pyrolysis fluid comprises carbon chains of a length from 13 to 20 carbon atoms.

3. A pyrolysis reactor comprising:
  the pyrolysis injector according to claim 1;
  a pyrolysis chamber pipe enveloping a paddle conveyor auger, arranged for conveying and pyrolyzing feed of said compacted oil-wet particulate polymeric materials, from said injector-reactor inlet connected to said pyrolysis injector, into pyrolysis fluids; and
  at least one pyrolysis fluid outlet for said pyrolysis fluids which is further connected to a first condenser for condensing a first pyrolysis fluid from said pyrolysis fluids into a first condensed pyrolysis fluid, wherein the first condenser comprises a first condensed pyrolysis fluid outlet for said first condensed pyrolysis fluid,
  wherein said pyrolysis chamber pipe comprises a condensed first pyrolysis fluid inlet for receiving at least part of said first condensed pyrolysis fluid from said first condenser.

4. The pyrolysis reactor according to claim 3, wherein said first pyrolysis fluid comprises carbon chains of a length above 20 carbon atoms.

5. The pyrolysis reactor according to claim 3, wherein said first condenser is further connected to a second condenser for condensing an intermediary pyrolysis fluid from said pyrolysis fluids into said intermediary condensed pyrolysis fluid.

6. The pyrolysis reactor according to claim 5, wherein said second condenser comprises an intermediary condensed pyrolysis fluid outlet arranged for said intermediary condensed pyrolysis fluid, and wherein said intermediary condensed pyrolysis fluid outlet is further connected to said oil inlet of said pyrolysis injector.

7. The pyrolysis reactor according to claim 6, wherein said intermediary condensed pyrolysis fluid outlet is further connected to a condensed pyrolysis fluid inlet, arranged near said injector-reactor inlet to said pyrolysis reactor, for receiving all or part of said intermediary pyrolysis fluid in a condensed state from said intermediary condensed pyrolysis fluid outlet from said second condenser.

8. The pyrolysis reactor according to claim 5, wherein said second condenser is further connected to a heat exchanger for condensing a condensable part of a third pyrolysis fluid from said pyrolysis fluids to a collection tank for said condensable part of said third pyrolysis fluid.

9. The pyrolysis reactor according to claim 8, wherein said third pyrolysis fluid comprises carbon chain lengths less than 13 carbon atoms.

10. The pyrolysis reactor according to claim 3, wherein said pyrolysis chamber pipe is arranged with successive heating devices, for successively heating said pyrolysis chamber pipe in order to successively transform said compacted oil-wet fragments into said pyrolysis fluids.

11. The pyrolysis reactor according to claim 3, wherein said pyrolysis reactor is arranged with a solids outlet for solid waste, which further comprises an air-proof path to a screw conveyor which is further connected to a waste box.

12. A vessel comprising the pyrolysis reactor according to claim 3.

13. A process for pyrolysis of particulate polymeric material comprising:
  providing an oil-wet particulate polymeric material in the pyrolysis injector according to claim 1;
  pre-heating the compacted oil-wet particulate polymeric material;
  injecting the pre-heated compacted oil-wet particulate polymeric material to a pyrolysis reactor comprising one or more heating devices;
  heating the pre-heated compacted oil-wet particulate polymeric material to form one or more gaseous pyrolysis products;
  withdrawing one or more gaseous pyrolysis products from the pyrolysis reactor and condensing the one or more gaseous pyrolysis products to form one or more pyrolysis liquids;
  feeding at least part of the one or more condensed pyrolysis liquids to the pyrolysis injector; and
  feeding at least part of the one or more condensed pyrolysis liquids to the pyrolysis reactor.

14. The process according to claim 13, wherein the condensing comprises feeding the one or more gaseous pyrolysis products to one or more condensers for condensing the one or more gaseous pyrolysis products and forming one or more condensed pyrolysis fluids.

* * * * *